US009638805B2

(12) United States Patent
Ruegamer et al.

(10) Patent No.: US 9,638,805 B2
(45) Date of Patent: May 2, 2017

(54) CONCEPT FOR DATA AUTHENTICATION AND SECURED LOCALIZATION BASED ON A SATELLITE NAVIGATION SIGNAL

(71) Applicant: Fraunhofer-Gesellschaft zur Foerderung der angewandten Forschung e.V., Munich (DE)

(72) Inventors: Alexander Ruegamer, Nuremberg (DE); Manuel Stahl, Nuremberg (DE); Guenter Rohmer, Erlangen (DE)

(73) Assignee: FRAUNHOFER-GESELLSCHAFT ZUR FOERDERUNG DER ANGEWANDTEN FORSCHUNG E.V, Munich (DE)

( * ) Notice: Subject to any disclaimer, the term of this patent is extended or adjusted under 35 U.S.C. 154(b) by 795 days.

(21) Appl. No.: 13/935,654

(22) Filed: Jul. 5, 2013

(65) Prior Publication Data

US 2014/0009336 A1 Jan. 9, 2014

Related U.S. Application Data

(60) Provisional application No. 61/668,205, filed on Jul. 5, 2012.

(30) Foreign Application Priority Data

Sep. 10, 2012 (EP) ..................... 12183749

(51) Int. Cl.
*G01S 19/32* (2010.01)
*G01S 19/21* (2010.01)
*G01S 5/00* (2006.01)

(52) U.S. Cl.
CPC ............ *G01S 19/32* (2013.01); *G01S 5/0018* (2013.01); *G01S 19/215* (2013.01)

(58) Field of Classification Search
CPC ....... G01S 19/32; G01S 19/215; G01S 5/0018
(Continued)

(56) References Cited

U.S. PATENT DOCUMENTS

2004/0078594 A1* 4/2004 Scott ................... H04L 63/0464
726/35
2011/0254731 A1* 10/2011 Musmeci .............. G01S 5/0027
342/357.25
(Continued)

FOREIGN PATENT DOCUMENTS

| EP | 2 075 592 A1 | 7/2009 |
| WO | WO 2004/059337 A1 | 7/2004 |
| WO | WO 2012/007720 A1 | 1/2012 |

OTHER PUBLICATIONS

Li, Z. et al: "Performance Analysis of a Civilian GPS Position authentication System", Plans 2012—Proceedings of IEEE/ION Plans 2012, The Institute of Navigation, 8551 Rixlew Lane Suite 360 Manassas, VA 20109, USA, Apr. 26, 2012, pp. 1028-1041.
(Continued)

*Primary Examiner* — Harry Liu
(74) *Attorney, Agent, or Firm* — Patterson Thuente Pedersen, P.A.

(57) ABSTRACT

Embodiments provide a satellite navigation receiver. The satellite navigation receiver has a receiver unit and a transmitter or a controller. The receiver unit is configured to receive and process a satellite navigation signal from a satellite navigation system at the certain time, to obtain a received signal, the received signal having a first component in a digital form, wherein the first component in the digital form is encrypted. The transmitter is configured to transmit the first component in the digital form together with an identification of a user of the satellite navigation receiver at the certain time. The controller is configured to store the first component in the digital form on a non-volatile storage
(Continued)

medium in association with other data representing an information from a location, at which the satellite navigation receiver was located at the certain time.

25 Claims, 11 Drawing Sheets

(58) Field of Classification Search
USPC .................................... 342/357.72; 380/255
See application file for complete search history.

(56) References Cited

U.S. PATENT DOCUMENTS

| | | | | |
|---|---|---|---|---|
| 2012/0023333 A1* | 1/2012 | Takada | ................ | G01S 5/0027 |
| | | | | 713/168 |
| 2012/0121087 A1* | 5/2012 | Psiaki | .................... | G01S 19/05 |
| | | | | 380/255 |
| 2013/0101121 A1* | 4/2013 | Nordholt | .............. | H04L 9/0852 |
| | | | | 380/279 |

OTHER PUBLICATIONS

Wu, J. et al: "Data Compression of Assisted-GPS Signal Processing", Processings of the 24$^{th}$ International Technical Meeting on the Satellite Division of the Institute of Navigation (ION HNSS 2011).
Kelsey, J. et al: "An Authenticated Camera", Computer Security Applications Conference, 1996, 12$^{th}$ Annual, 7 pages.
Lo. S. et al: "Signal Authentication; A Secure Civil GNSS for Today", Inside GNSS, Sep./Oct. 2009.
European Search Report, Applicatoin No.: EP 12183749, mailed May 10, 2013, 2 pages.

* cited by examiner

CONCEPT FOR DATA AUTHENTICATION AND SECURED LOCALIZATION BASED ON A SATELLITE NAVIGATION SIGNAL

CROSS-REFERENCE TO RELATED APPLICATIONS

This application claims priority to U.S. Provisional Application No. 61/668,205, which was filed on Jul. 5, 2012, and from European Application No. 12183749.6, which was filed on Sep. 10, 2012, which are both incorporated herein by reference in their entireties.

TECHNICAL FIELD

Embodiments relate to a satellite navigation receiver. Further embodiments relate to a mobile localization device. Further embodiments relate to a mobile measurement device. Further embodiments relate to a method for localizing a user of a satellite navigation receiver. Further embodiments relate to a method for verifying whether other data representing an information from a location was recorded at an indicated time and location. Some embodiments relate to a concept for LBS (LBS=location based service) authentication with Galileo PRS (PRS=public regulated service).

BACKGROUND

In the article [S. Lo et al., "Signal Authentication: A Secure Civil GNSS for Today", Inside GNSS September/October 2009] a position and time authentication based on the military GPS (GPS=global positioning system) signals is described. According to the proposed concept, the raw data including the military GPS signals have to be recorded constantly nearby the position of interest, to be able to prove the position and time later on by a cross-correlation between the snapshot signal and its reference received counterpart.

Moreover, a proof-of-concept to extract position and time out of a GPS-snapshot is given in the article [Wu, J.; Dempster, A.; "Data Compression of Assisted-GPS Signal Processing", Proceedings of the 24th International Technical Meeting of The Satellite Division of the Institute of Navigation (ION GNSS 2011)].

In addition, in the article [Kelsey, J.; Schneier, B.; Hall, C.; "An authenticated camera," Computer Security Applications Conference, 1996., 12th Annual, vol., no., pp. 24-30, 9-13 Dec. 1996; doi: 10.1109/CSAC.1996.569666;] an approach for an "authenticated camera" using a certain interaction between the camera and its base station before and after its usage is presented. However, the biggest gap identified in the proposed architecture is the strong need for authenticated location data.

SUMMARY

According to an embodiment, a satellite navigation receiver may have: a receiver unit configured to receive and process a satellite navigation signal from a satellite navigation system at a certain time, to obtain a received signal, the received signal having a first component in a digital form, wherein the first component in the digital form is encrypted; and a transmitter configured to transmit the first component in the digital form together with an identification of a user of the satellite navigation receiver at the certain time; or a controller configured to store the first component in the digital form on a non-volatile storage medium in association with other data representing an information from a location, at which the satellite navigation receiver was located at the certain time.

According to another embodiment, a mobile localization device may have: a satellite navigation receiver as mentioned above; and a control unit configured to control the transmitter of the satellite navigation receiver to transmit the first component in the digital form together with the identification of the user periodically or in response to an external event.

According to another embodiment, a mobile measurement device may have: a satellite navigation receiver as mentioned above; and a sensor configured to provide measurement data as the other data describing the information from the location, at which the satellite navigation receiver was located at the certain time.

According to another embodiment, a method may have the steps of receiving and processing a satellite navigation signal from a satellite navigation system at a certain time, to obtain a received signal, the received signal having a first component in a digital form, wherein the first component in the digital form is encrypted; and transmitting the first component in the digital form together with an identification of a user of the satellite navigation receiver at the certain time; or storing the first component in the digital form on a non-volatile storage medium in association with other data representing an information from a location, at which the satellite navigation receiver was located at the certain time.

According to another embodiment, a method for localizing a user of a satellite navigation receiver, wherein the satellite navigation receiver has a receiver unit and a transmitter, wherein the receiver unit is configured to receive and process a satellite navigation signal from a satellite navigation system at a certain time and location, to obtain a received signal, the received signal having a first component in a digital form, wherein the first component in the digital form is encrypted, and wherein the transmitter is configured to transmit the first component in the digital form together with an identification of the user of the satellite navigation receiver at the certain time, may have the steps of: receiving the first component in the digital form together with the identification of the user of the satellite navigation receiver at the certain time; reconstructing the first component of the satellite navigation system based on an indicated time using an encryption key of the satellite navigation system; correlating the first component in the digital form and the reconstructed first component in the digital form, in order to obtain the certain time and location, at which the satellite navigation receiver received the satellite navigation signal; and allocating the certain time and location to the user identified by the identification.

According to another embodiment, a method for verifying whether other data representing an information from a location was recorded at an indicated time and location, wherein the other data representing the information from the location is stored on a non-volatile storage medium in association with a first component in a digital form of a received signal that was obtained by receiving and processing a satellite navigation signal from a satellite navigation system at a certain time, wherein the first component in the digital form is encrypted, may have the steps of: reading from the non-volatile storage medium the first component in the digital form; reconstructing the first component in the digital form of the satellite navigation signal based on the indicated time and location using a first encryption key of the satellite navigation system; and correlating the first component in the digital form and the reconstructed first component in the digital form, in order to verify whether the other data was recorded at the indicated time and location.

Another embodiment may have a computer program having a program code for performing, when running on a computer or microprocessor, a method for localizing as mentioned above or a method for verifying as mentioned above.

In embodiments, the satellite navigation receiver comprises the receiver unit and the transmitter. The receiver unit receives and processes the satellite navigation signal from the satellite navigation system, e.g., from the Galileo satellite navigation system, at the certain time and provides the received signal comprising the first component in the digital form. The first component in the digital form is encrypted, e.g., with a first key of the satellite navigation system, wherein access to the first key of the satellite navigation system can be restricted, e.g., to governmental authorized institutions. The transmitter transmits the first component in the digital form together with the identification of the user of the satellite navigation receiver at the certain time. Since the first component in the digital form is encrypted, the user of the satellite navigation system can only be localized by someone capable of decrypting the first component in the digital form, e.g., someone having access to the first key of the satellite navigation system.

Furthermore, in embodiments, the satellite navigation receiver comprises the receiver unit and the controller. The receiver unit receives and processes the satellite navigation signal from the satellite navigation system, e.g., from the Galileo satellite navigation system, at the certain time and provides the received signal comprising the first component in the digital form. The first component in the digital form is encrypted, e.g., with a first key of the satellite navigation system, wherein access to the first key of the satellite navigation system can be restricted. The controller is configured to store the first component in the digital form on a non-volatile storage medium in association with other data representing an information from a location, at which the satellite navigation receiver was located at the certain time. Since the first component in the digital form is encrypted, someone capable of decrypting the first component in the digital form, e.g., someone having access to the first key of the satellite navigation system, can verify whether the other data representing the information from the location was recorded at an indicated time and location.

Embodiments also provide a method. A method can comprise receiving and processing a satellite navigation signal from a satellite navigation system at a certain time, to obtain a received signal, the received signal comprising a first component in a digital form, wherein the first component in the digital form is encrypted. The method can further comprise transmitting the first component in the digital form together with an identification of a user of the satellite navigation receiver at the certain time, or storing the first component in the digital form on a non-volatile storage medium in association with other data representing an information from a location, at which the satellite navigation receiver was located at the certain time.

Further, embodiments provide a mobile localization device comprising a satellite navigation receiver and a control unit. The satellite navigation receiver comprises a receiver unit and a transmitter. The receiver unit is configured to receive and process a satellite navigation signal from a satellite navigation system at a certain time, to obtain a received signal, the received signal comprising a first component in a digital form, wherein the first component in the digital form is encrypted. The transmitter is configured to transmit the first component in the digital form together with an identification of a user of the satellite navigation receiver at the certain time. The control unit is configured to control the transmitter to transmit the first component in the digital form together with the identification of the user periodically or in response to an external event.

In addition, embodiments provide a mobile measurement device comprising a satellite navigation receiver and a sensor. The satellite navigation receiver comprises a receiver unit and a controller. The receiver unit is configured to receive and process a satellite navigation signal from a satellite navigation system at a certain time, to obtain a received signal, the received signal comprising a first component in a digital form, wherein the first component in the digital form is encrypted. The controller is configured to store the first component in the digital form on a non-volatile storage medium in association with other data representing an information from a certain location, at which the satellite navigation receiver was located at the certain time. The sensor is configured to provide measurement data as the information from the location, at which the satellite navigation receiver was located at the certain time.

Moreover, embodiments provide a method for localizing a user of a satellite navigation receiver. The satellite navigation receiver comprises a receiver unit and a transmitter. The receiver unit is configured to receive and process a satellite navigation signal from a satellite navigation system at a certain time, to obtain a received signal, the received signal comprising a first component in a digital form, wherein the first component in the digital form is encrypted. The transmitter is configured to transmit the first component in the digital form together with an identification of the user of the satellite navigation receiver at the certain time. The method can comprise receiving the first component in the digital form together with the identification of the user of the satellite navigation receiver at the certain time. The method can further comprise reconstructing the first component of the satellite navigation system based on an indicated time using a first encryption key of the satellite navigation system. The method can also comprise correlating the first component in the digital form and the reconstructed first component in the digital form, in order to obtain the certain time location, at which the satellite navigation receiver received the satellite navigation signal. The method can further comprise allocating the certain time and location to the user identified by the identification.

Furthermore, embodiments provide a method for verifying whether other data representing an information from a location was recorded at an indicated time and location, wherein the other data representing the information from the location is stored on a non-volatile storage medium in association with a first component in a digital form of a received signal that was obtained by receiving and processing a satellite navigation signal from a satellite navigation system at a certain time, wherein the first component in the digital form is encrypted. The method can comprise reading from the non-volatile storage medium the first component in the digital form, reconstructing the first component in the digital form of the satellite navigation signal based on the intended time and location using a first encryption key of the satellite navigation system, and correlating the first component in the digital form and the reconstructed first component in the digital form, in order to verify whether the other data was recorded at the indicated time and location.

BRIEF DESCRIPTION OF THE DRAWINGS

Embodiments are described herein, making reference to the appended drawings, in which.

DETAILED DESCRIPTION OF THE INVENTION

Figure 1:
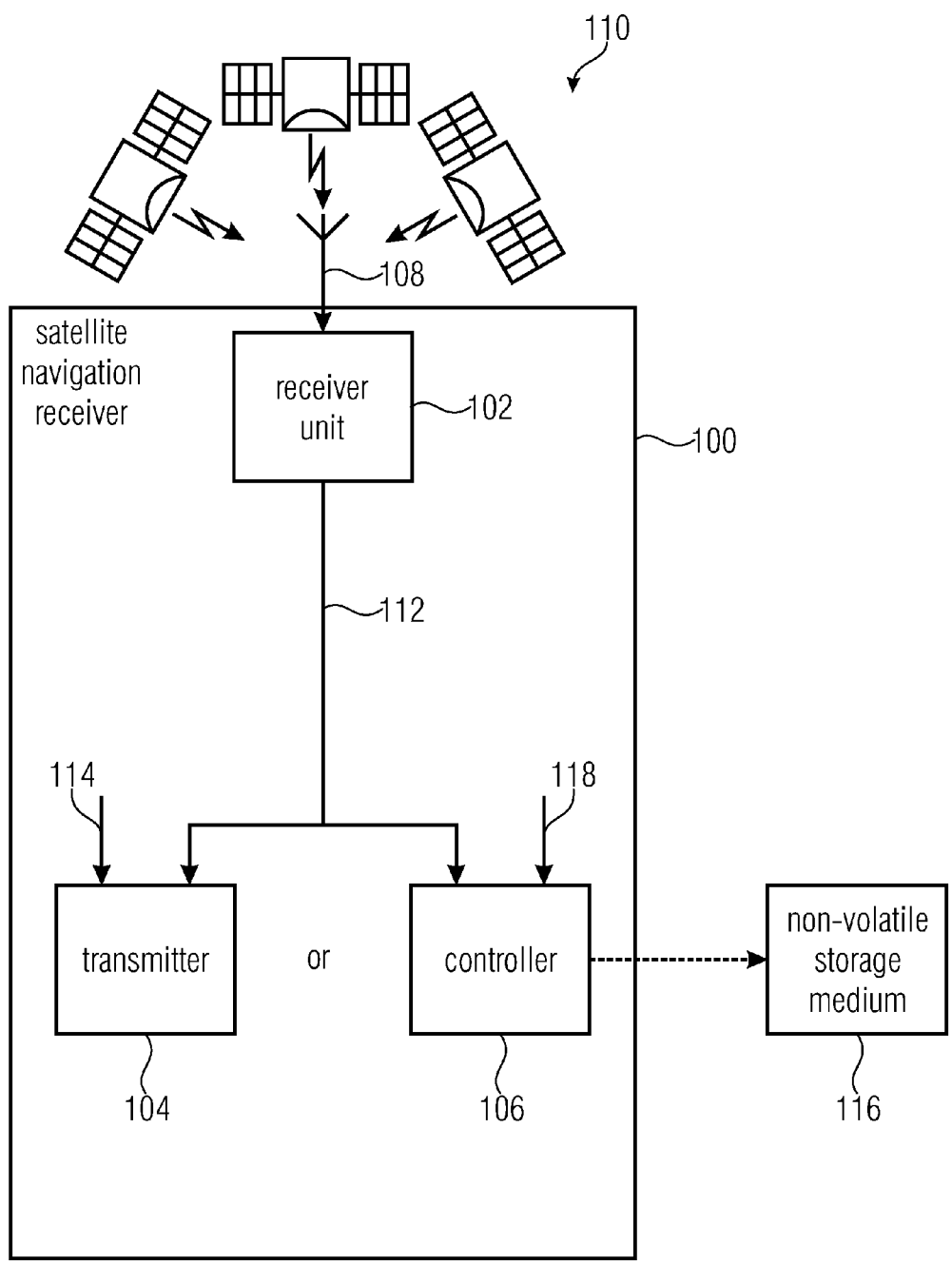
FIG. 1 shows a block diagram of a satellite navigation receiver according to an embodiment.

Equal or equivalent elements with equal or equivalent functionality are denoted in the following description by equal or equivalent reference numerals.

In the following description, a plurality of details are set forth to provide a more thorough explanation of embodiments of the present invention. However, it will be apparent to those skilled in the art that embodiments of the present invention may be practiced without these specific details. In other instances, well-known structures and devices are shown in block diagram form rather than in detail in order to avoid obscuring embodiments of the present invention. In addition, features of the different embodiments described hereinafter may be combined with each other, unless specifically noted otherwise.

FIG. 1 shows a block diagram of a satellite navigation receiver 100 according to an embodiment. The satellite navigation receiver 100 comprises a receiver unit 102 and a transmitter 104 or a controller 106. The receiver unit 102 is configured to receive and process a satellite navigation signal 108 from a satellite navigation system 110 at a certain time, to obtain a received signal 112, the received signal 112 comprising a first component in a digital form, wherein the first component in the digital form is encrypted. The transmitter 104 is configured to transmit the first component in the digital form together with an identification 114 of a user of the satellite navigation receiver 100 at the certain time. The controller 106 is configured to store the first component in the digital form on a non-volatile storage medium 116 in association with other data 118 representing an information from a location, at which the satellite navigation receiver was located at the certain time.

In embodiments, the satellite navigation receiver 100 comprises the receiver unit 102 and the transmitter 104. The receiver unit 102 receives and processes the satellite navigation signal 108 from the satellite navigation system 110, e.g., from the Galileo satellite navigation system, at the certain time and provides the received signal 112 comprising the first component in the digital form. The first component in the digital form is encrypted, e.g., with a first key of the satellite navigation system 110, wherein access to the first key of the satellite navigation system can be restricted. The transmitter 104 transmits the first component in the digital form together with the identification 114 of the user of the satellite navigation receiver 100 at the certain time. Since the first component in the digital form is encrypted, the user of the satellite navigation system can only be localized by someone capable of decrypting the first component in the digital form, e.g., someone having access to the first key of the satellite navigation system 110.

Furthermore, in embodiments, the satellite navigation receiver 100 comprises the receiver unit and the controller 106. The receiver unit 102 receives and processes the satellite navigation signal 108 from the satellite navigation system 110, e.g., from the Galileo satellite navigation system, at the certain time and provides the received signal 112 comprising the first component in the digital form. The first component in the digital form is encrypted, e.g., with a first key of the satellite navigation system 110, wherein access to the first key of the satellite navigation system can be restricted. The controller is configured to store the first component in the digital form on a non-volatile storage medium 116 in association with other data 118 representing an information from a location, at which the satellite navigation receiver was located at the certain time. Since the first component in the digital form is encrypted, someone capable of decrypting the first component in the digital form, e.g., someone having access to the first key of the satellite navigation system, can verify whether the other data representing the information from the location was recorded at an indicated time and location.

Note that the satellite navigation receiver 100 does not comprise an decryption unit configured to decrypt the first component in the digital form. Furthermore, the satellite navigation receiver 100 does not comprise the first key of the satellite navigation system 110 necessitated for decrypting the first component in the digital form. Hence, the satellite navigation receiver 100 is not capable of decrypting the first component in the digital form.

In some embodiments, the satellite navigation receiver 100 can comprise a non-volatile storage medium 116. In other embodiments, the non-volatile storage medium 116 can be an external non-volatile storage medium 116. For example, as shown in FIG. 1, the controller 106 can be configured to store the first component in the digital form on an external non-volatile storage medium 116 in association with the other data 118 representing the information from the location, at which the satellite navigation receiver was located at the certain time. The non-volatile storage medium 116 can be a storage medium configured for permanently storing data, such as a hard disk drive or a solid state disk.

Figure 2:
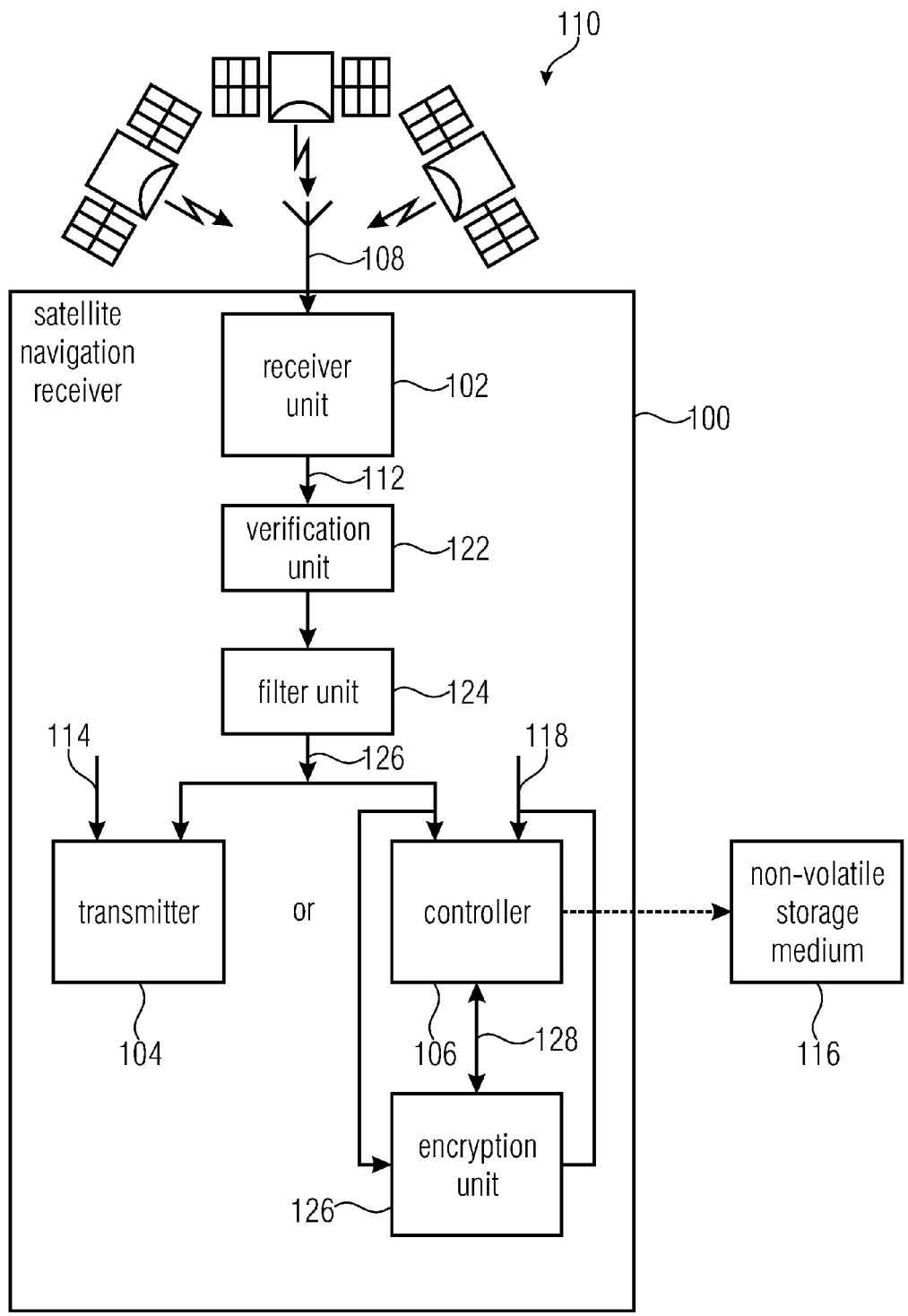
FIG. 2 shows a block diagram of the satellite navigation receiver according to a further embodiment.

FIG. 2 shows a block diagram of the satellite navigation receiver 100 according to another embodiment. In contrast to FIG. 1, the satellite navigation receiver 100 shown in FIG. 2 comprises a verification unit 122 configured to verify whether data carried by a second component in the digital form of the received signal 112 is valid. The transmitter 104 can be configured to transmit the first component in the digital form together with the identification 114 of the user, if the data carried by the second component in the digital form is valid. The controller 106 can be configured to store the first component in the digital form on the non-volatile storage medium 116 in association with the other data 118, if the data carried by the second component in the digital form is valid.

For example, the verification unit 122 can be configured to verify whether the data carried by the second component in the digital form is valid by verifying whether a location of the satellite navigation receiver 100 can be determined based on the data carried by the second component in the digital form.

According to the concept, it can be assumed that the data carried by the first component in the digital form is valid, if the data carried by the second component in the digital form is valid. Thus, by verifying whether the data carried by the second component in the digital form is valid, the verification unit 122 can verify whether the data carried by the first component in the digital form is valid.

In some embodiments, the second component in the digital form is not encrypted, such that the satellite navigation receiver 100 can directly verify whether the data carried by the second component in the digital form is valid. If the data carried by the second component in the digital form is valid, then data carried by the first component in the digital form should also be valid. Nevertheless, in some embodiments, the second component in the digital form can be encrypted with a second key of the satellite navigation system 110, different from the first key of the satellite navigation system 110. In that case, the satellite navigation receiver 100 may comprise a decrypting unit configured to decrypt the second component in the digital form using the second key of the satellite navigation system 110, and to verify whether the data carried by the decrypted second component in the digital form is valid.

Note that access to the first key of the satellite navigation system 110 with which the first component in the digital form is encrypted can be restricted or limited to governmental authorized institutions, wherein access to the second key of the satellite navigation system 110 may not be limited to governmental authorized institutions.

The satellite navigation receiver 100 can comprise a filter unit 124 configured to filter out the second component in the digital form from the received signal 112, to obtain a filtered signal 126, the filtered signal 126 comprising the first component in the digital form, and to provide the filtered signal 126 to the transmitter 104 or controller 106.

In some embodiments, the transmitter 104 can be configured to transmit the first component in the digital form further together with an indicated time, at which the satellite navigation receiver received the satellite navigation signal.

Note that the indicated time can be a time provided by a local clock of the satellite navigation receiver 100, wherein the certain time is a time described by (or encoded in) the first component in the digital form. In other words, the certain time is the time at which the satellite navigation receiver 100 received the satellite navigation signal 108. Thus, the indicated time may deviate (slightly) from the certain time. Moreover, the satellite navigation receiver 100 can be configured to determine the indicated time based on the data carried by the second component in the digital form. In that case, the indicated time can be equal to the certain time.

For example, a governmental authorized institution having access to the first key of the satellite navigation system 110 can reconstruct the first component in the digital form based on the indicated time using the first key of the satellite navigation system 110, and compare the reconstructed first component in the digital form with the first component in the digital form transmitted by the transmitter 104 in order to localize the user of the satellite navigation receiver 100.

In some embodiments, the controller 106 can be configured to store the first component in the digital form on the non-volatile storage medium 116 further in association with an indicated time and location, at which the other data 118 were recorded.

Note that the indicated time and location can be determined by the satellite navigation receiver 100 based on the data carried by the second component in the digital form. In that case, the indicated time and location would be equal to the certain time and location encoded in the first component in the digital form. However, if the indicated time and position are manipulated or spoofed, then the indicated time and position will deviate from the certain time and location.

For example, a governmental authorized institution having access to the first key of the satellite navigation system 110 can reconstruct the first component in the digital form based on the indicated time and location using the first key of the satellite navigation system 110, and compare the reconstructed first component in the digital form with the first component in the digital form transmitted by the transmitter 104 in order to verify whether the other data representing the information from the location was recorded at the indicated time and location As shown in FIG. 2, in some embodiments, the satellite navigation receiver 100 can comprise an encryption unit 126 configured to encrypt the first component in the digital form or the other data 118 representing the information from the location, at which the satellite navigation receiver 100 was located at the certain time, using a private key in order to obtain encrypted data. The controller 106 can be configured to store the first component in the digital form on the non-volatile storage medium 116 further in association with the encrypted data 128.

Figure 3:
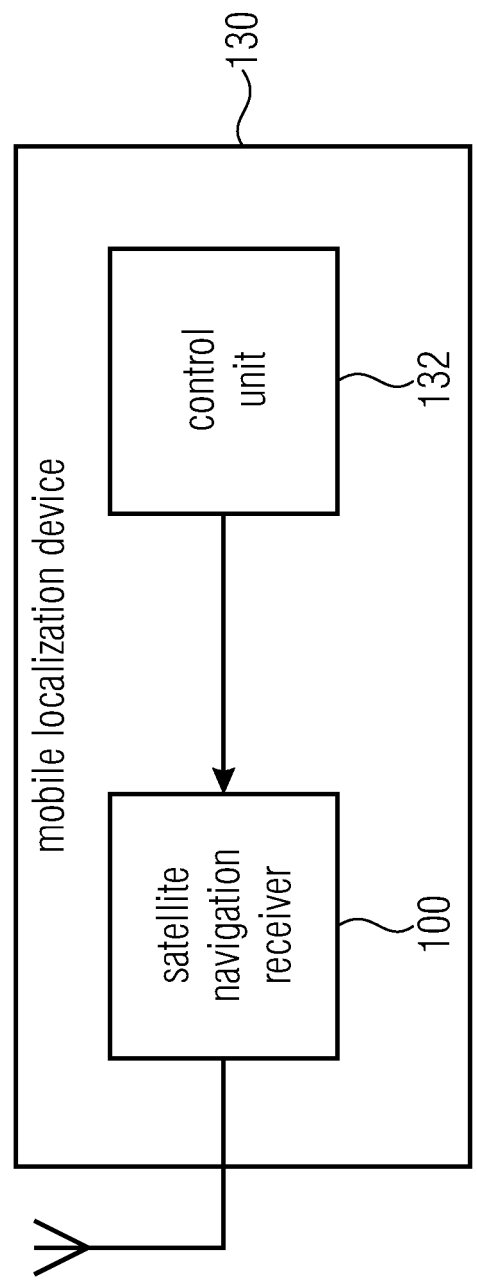
FIG. 3 shows a block diagram of a mobile localization device according to an embodiment.

FIG. 3 shows a block diagram of a mobile localization device 130 according to an embodiment. The mobile localization device 130 can comprise the satellite navigation receiver shown in FIG. 1 or 2 and a control unit 132. The control unit 132 can be configured to control the transmitter 104 of the satellite navigation receiver 100 to transmit the first component in the digital form together with the identification 114 of the user periodically or in response to an external event.

The mobile localization device 130 can be, for example, an electronic tag. In that case, the control unit 132 can be configured to control the transmitter 104 of the satellite navigation receiver 100 to transmit the first component in the digital form together with the identification 114 of the user periodically.

Furthermore, the mobile localization device 130 can be used in an emergency call system, wherein the control unit 132 can be configured to control the transmitter 104 to transmit the first component in the digital form together with the identification 114 of the user in response to an external event. The external event can be an emergency call triggered by the user of the satellite navigation receiver 100 or an automatically detected road accident of a vehicle of the user of the satellite navigation receiver 100.

Figure 4:
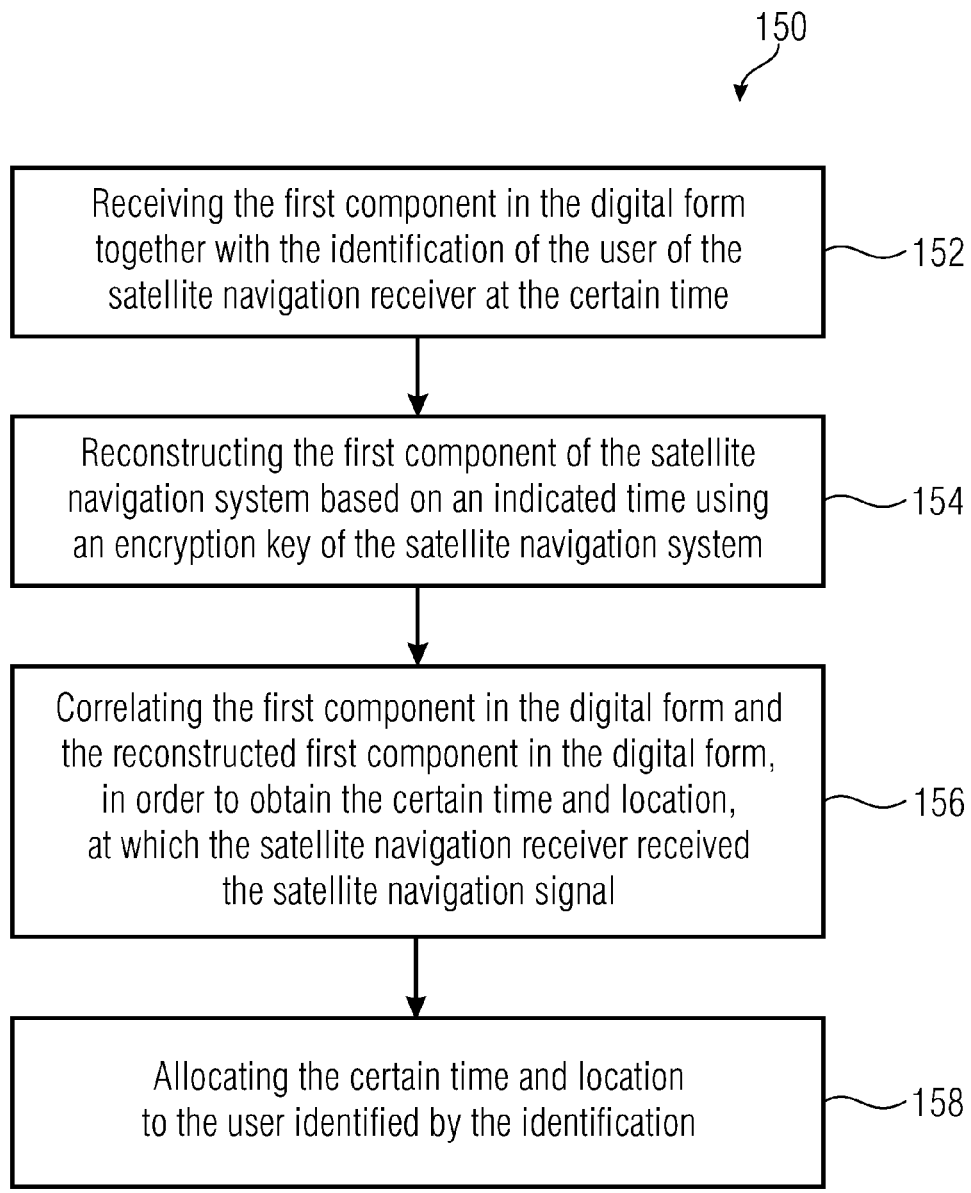
FIG. 4 shows a flowchart of a method for localizing a user of a satellite navigation receiver according to an embodiment.

FIG. 4 shows a flowchart of a method 150 for localizing a user of the satellite navigation receiver 100 shown in FIGS. 1 and 2 according to an embodiment of the present invention. A first step 152 of the method 150 comprises receiving the first component in the digital form together with the identification of the user of the satellite navigation receiver at the certain time. A second step 154 of the method 150 comprises reconstructing the first component of the satellite navigation system based on an indicated time using a first encryption key of the satellite navigation system. A third step 156 of the method 150 comprises correlating the first component in the digital form and the reconstructed first component in the digital form, in order to obtain the certain time and location, at which the satellite navigation receiver received the satellite navigation signal. A fourth step 158 of the method 150 comprises allocating the certain time and location to the user identified by the identification.

The method 150 shown in FIG. 4 can be used, for example, by governmental authorized institutions having access to the first key of the satellite navigation system 110. Since access to the first key of the satellite navigation system 110 is regulated, the user of the satellite navigation receiver 100 can be sure that only those having access to the first key of the satellite navigation system 110 are capable of tracking his position.

In the following, a practical implementation example of the satellite navigation receiver 100 shown in FIGS. 1 and 2 and of the method 150 for localizing the user of the satellite navigation receiver 100 shown in FIG. 4 is described by way of example for the Galileo satellite navigation system 110. Thereby, the satellite navigation signal is the Galileo signal received from the Galileo Satellite navigation system 110, wherein the first component in the digital form is the PRS component of the Galileo signal 108, and wherein the second component in the digital form is the OS (or CS) component of the Galileo signal 108 (compare with FIG. 11).

Figure 5:
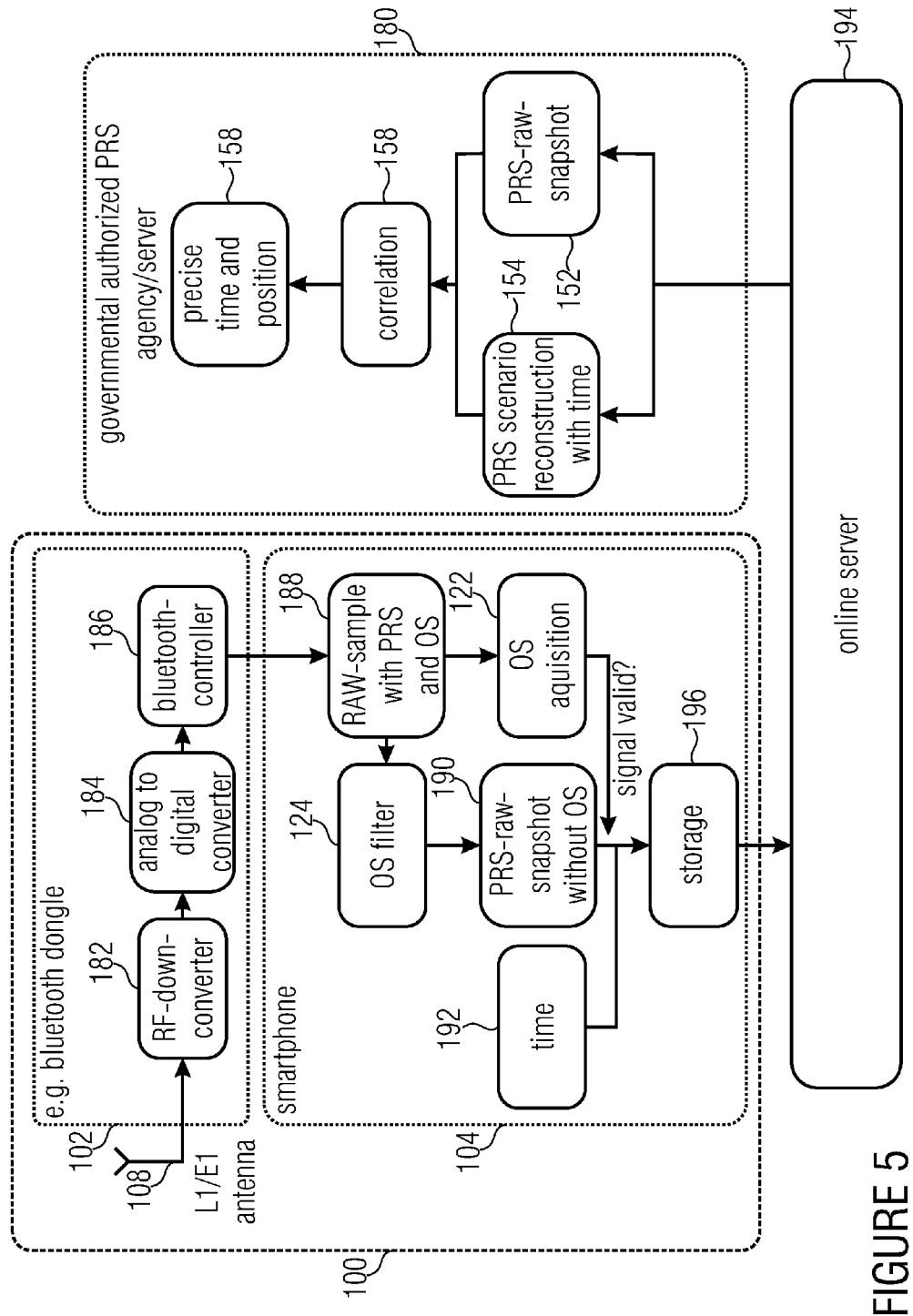
FIG. 5 shows an illustrative view of a satellite navigation receiver and a governmental authorized server configured to perform the method for localizing a user of a satellite navigation receiver, according to an embodiment.

FIG. 5 shows an illustrative view of a satellite navigation receiver 100 and a governmental authorized server 180 configured to perform the method 150 for localizing a user of a satellite navigation receiver 100 according to an embodiment.

As shown in FIG. 5, the receiver unit 102 of the satellite navigation receiver 100 can be implemented by means of a Bluetooth dongle 102. The Bluetooth dongle 102 can be configured to receive and process the Galileo satellite navigation signal 108 from the Galileo satellite navigation system 110 at the certain time, to obtain the received signal comprising the PRS component (first component in the digital form) and the OS (or CS) component (second component in the digital form).

The Bluetooth dongle 102 can comprise a RF-downconverter 182, an analog-to-digital converter 184 and a Bluetooth controller 186, wherein the Bluetooth dongle 102 can be configured to collect a certain amount of raw data of the OS and PRS frequencies, e.g., to obtain a raw-sample 188 with PRS and OS components (first component in the digital form and second component in the digital form).

Moreover, as indicated in FIG. 5, the above described functionality of the transmitter 104 can be performed by means of a smartphone 104. The smartphone 104 may obtain from the Bluetooth dongle 102 the raw-sample 188 with PRS and OS components. The verification unit 122 can be configured to verify or check whether the data collection was successful with an OS acquisition. If the data collection was successful, then the filter unit 124 can remove the OS components in order to obtain a PRS-raw-snapshot 190 without OS components. The removal of the OS components can be performed, e.g., with a high-pass filter 124, to reduce the snapshot file size. Without OS components, nobody but governmental authorized PRS agencies can use the snapshot. The transmitter 104 can be configured to transmit the PRS-raw-snapshot 190 together with an approximate time 192 (indicated time) to a server 194, e.g., an online server. Besides being transmitted, the PRS-raw-snapshot 190 can be stored in a storage 196, e.g. a non-volatile storage medium.

Note that the PRS-raw-snapshot 190 can only be used by institutions that are authorized to use the Galileo PRS component and that are equipped with the keys for the timeframe (first key of the satellite navigation system). To get the position and time (certain time and location) of the PRS-raw-snapshot 190, the PRS-raw-snapshot 190 is forwarded to a governmental authorized server 180.

The governmental authorized server 180, e.g., of a governmental authorized PRS agency or institution, can be configured to receive at 152 the PRS-raw-snapshot 190 (first component in the digital form), e.g., together with the identification of the user of the satellite navigation receiver at the certain time. At 154, the governmental authorized server 180 can reconstruct the PRS scenario based on the coarse time (indicated time). At 156, the governmental authorized server 180 can perform a correlation between the PRS-raw-snapshot 190 and the reconstructed PRS-scenario in order to obtain a precise time and position at 158.

In other words, the governmental authorized server 180 can be configured to recreate the PRS scenario and to estimate the position and time using the additional provided coarse time. Although the user position is constantly made available with PRS snapshots uploaded to a server 194, the user privacy is still protected, since only authorized personal can find out the user position using their PRS infrastructure with valid keys (first key of the satellite navigation system 110).

Figure 6:
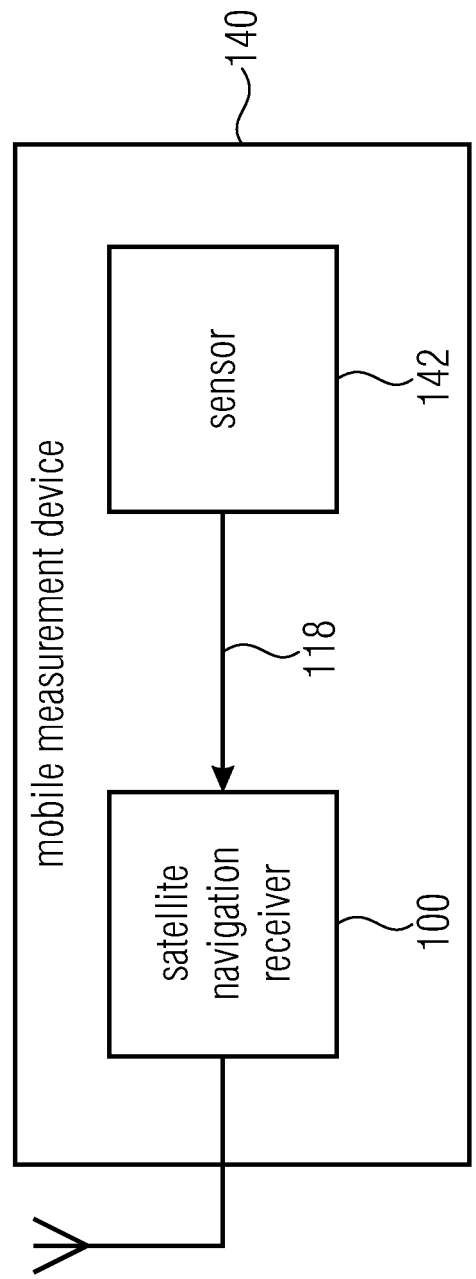
FIG. 6 shows a block diagram of a mobile measurement device according to an embodiment.

FIG. 6 shows a block diagram of a mobile measurement device 140 according to an embodiment. The mobile measurement device 140 can comprise the satellite navigation receiver 100 shown in FIGS. 1 and 2 and a sensor 142. The sensor 142 can be configured to provide measurement data 118 as the information from the location, at which the satellite navigation receiver 100 was located at the certain time.

In some embodiments, the sensor 142 can be an environmental sensor 142 configured to provide environmental data as the measurement data 118.

For example, the environmental sensor 142 can be a carbon dioxide sensor 142 configured to provide environmental data indicating a carbon dioxide concentration at the location, at which the satellite navigation receiver 100 was located at the certain time. Furthermore, the environmental sensor can 142 be a radiation sensor 142 configured to provide environmental data indicating a radiation level, e.g., a radioactive radiation or ultraviolet radiation, at the location, at which the satellite navigation receiver 100 was located at the certain time.

Naturally, the sensor 142 can also be configured to provide measurements like photos, audio files and videos recorded at the certain time and location as the other data 118.

Figure 7:
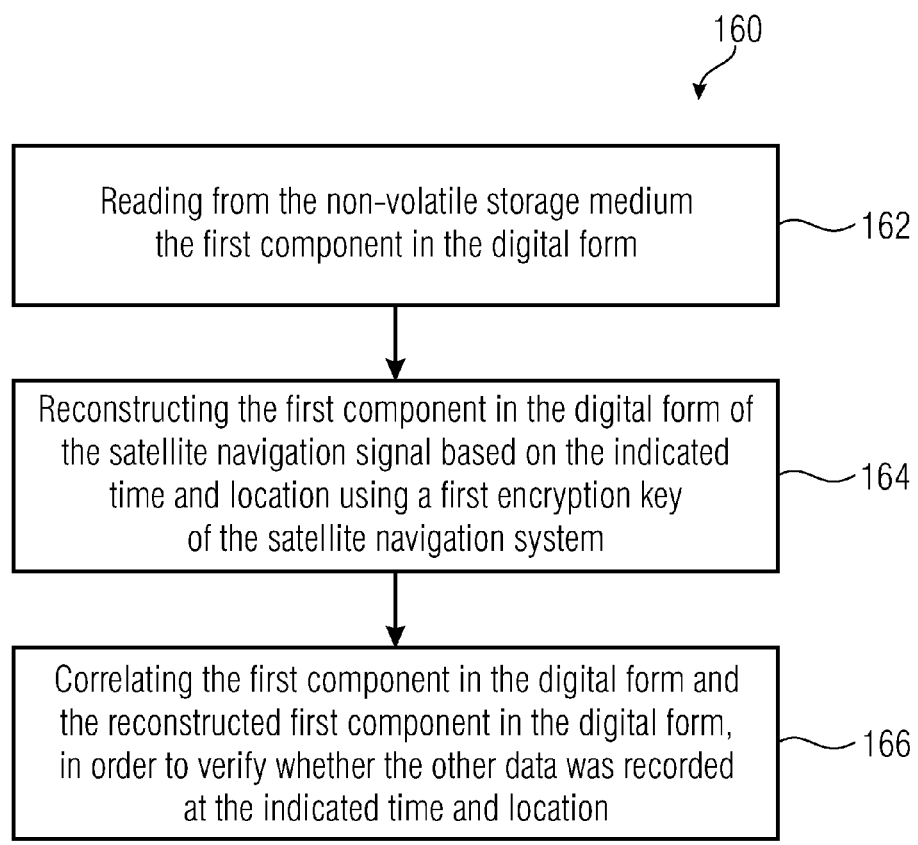
FIG. 7 shows a flowchart of a method for verifying whether other data representing an information from a location was recorded at an indicated time and location, according to an embodiment.

FIG. 7 shows a flowchart of a method 160 for verifying whether data representing an information from a location was recorded at an indicated time and location, according to an embodiment of the present invention. At 162, the comprises reading from the non-volatile storage medium the first component in the digital form. At 164, the method 160 comprises reconstructing the first component in the digital form of the satellite navigation signal based on the indicated time and location using a first encryption key of the satellite navigation system. At 166, the method 160 comprises correlating the first component in the digital form and the reconstructed first component in the digital form, in order to verify whether the other data was recorded at the indicated time and location.

By storing the first component in the digital form on the non-volatile storage medium 116 in association with the other data 118, it can be verified whether the data representing an information from a location was recorded at the indicated time and location. Since only governmental authorized institutions have access to the first key of the satellite navigation system, spoofing of the indicated time and location, at which the other data 118 was recorded is (nearly) impossible. Hence, the other data 118 can be authenticated afterwards by a governmental authorized institution.

For example, if the other data 118 representing the information from the location was not recorded at the indicated time and location, then the correlation of the first component in the digital form and the reconstructed first component in the digital form would indicate a spoofing or manipulation of the indicated time and/or location. Or in other words, if the indicated time and location deviates from the certain time and location encoded in the first component in the digital form, then the correlation of the first component in the digital form and the reconstructed first component in the digital form would indicate a spoofing or manipulation of the indicated time and/or location.

In the following, a practical implementation example of the satellite navigation receiver 100 shown in FIGS. 1 and 2 and of the method 160 for verifying whether data representing an information from a location was recorded at an indicated time and location shown in FIG. 7 is described by way of example for the Galileo Satellite navigation system 110. Thereby, the satellite navigation signal is the Galileo signal received from the Galileo Satellite navigation system 110, wherein the first component in the digital form is the PRS component, and wherein the second component in the digital form is the OS (or CS) component (compare with FIG. 11).

Figure 8:
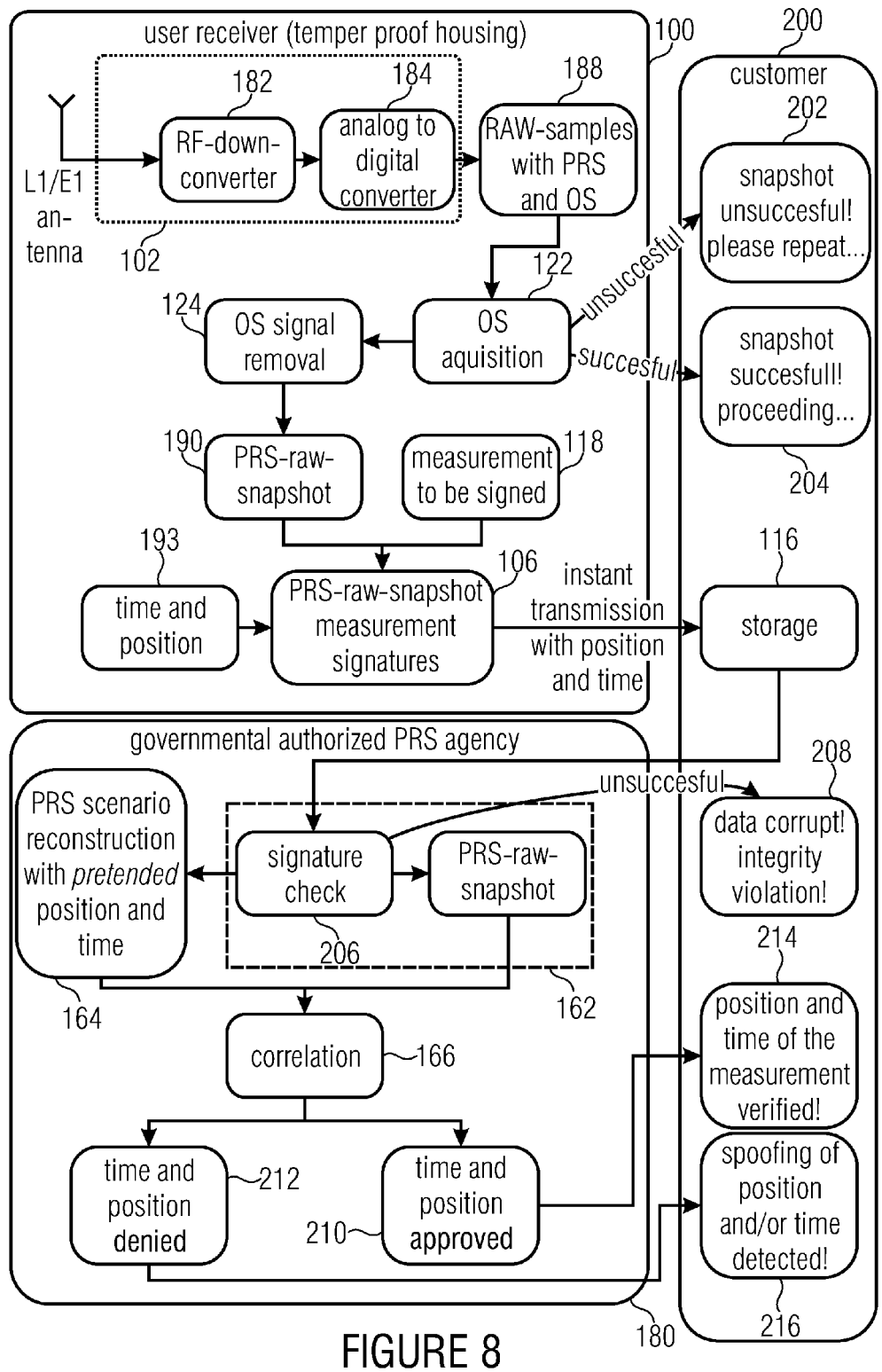
FIG. 8 shows an illustrative view of the satellite navigation receiver and a governmental authorized server configured to perform the method for verifying whether other data representing an information from a location was recorded at an indicated time and location, according to an embodiment.

FIG. 8 shows an illustrative view of the satellite navigation receiver 100 and a governmental authorized server 180 configured to perform the method 160 for verifying whether other data 118 representing an information from a location was recorded at an indicated time and location, according to an embodiment of the present invention.

As shown in FIG. 8, the receiver unit 102 of the satellite navigation receiver 100 can be configured to receive and process the Galileo satellite navigation signal 108 from the Galileo satellite navigation system 110 at the certain time, to obtain the received signal comprising the PRS component (first component in the digital form) and the OS (or CS) component (second component in the digital form).

The receiver unit 102 can comprise a RF-down-converter 182 and an analog-to-digital converter 184, wherein the receiver unit 102 can be configured to collect a certain amount of raw data of the OS and PRS frequencies, e.g., to obtain a raw-sample 188 with PRS and OS components (first component in the digital form and second component in the digital form).

The verification unit 122 can be configured to verify or check whether the data collection was successful with an OS acquisition. Moreover, the verification unit 122 can be configured to indicate to a server 200 of a customer (or user) of the satellite navigation receiver 100 whether the data collection was successful. Thereby, a first information 202 may indicate that the data collection was successful, where a second information 204 may indicate that the data collection was unsuccessful. If the data collection was successful, then the filter unit 124 can remove the OS components in order to obtain a PRS-raw-snapshot 190 without OS components. The removal of the OS components can be performed, e.g., with a high-pass filter, to reduce the snapshot file size. Without OS components, nobody but governmental authorized PRS agencies can use the snapshot. The controller 106 can be configured to store the PRS-raw-snapshot 190 in association with the measurement 118 and an approximate time and location 193 (indicated time and location) on the storage 116, e.g., a non-volatile storage medium 116 of the server 200 of the customer. In other words, the controller 106 can be configured to store (instant transmission with position and time) the PRS-raw-snapshot with a measurement signature (signed measurement) on the storage 116.

In other words, the measurement 118 and PRS-raw-snapshot 190 can be cryptographically combined. Then, the combined data (PRS-raw-snapshot 190, measurement 118 and indicated time and location 193) can be transmitted to a server (e.g., the customer). The customer can now validate time and location of the measurement by forwarding the PRS-raw-snapshot with its pretended time and location (indicated time and location) to a governmental authorized PRS agency (e.g., to a governmental authorized server 180).

The governmental authorized server 180, e.g., of a governmental authorized PRS agency or institution, can be configured to read at 162 the combined data (PRS-raw-snapshot 190, measurement 118 and indicated time and location 193) from the storage 116. Moreover, the governmental authorized server 180 can perform a signature check 206. If the signature check is unsuccessful, then the governmental authorized server 180 can indicate to the server 200 of the customer the unsuccessful signature check by means of an information 208 (data corrupt/integrity violation). If the signature check is successful, then the PRS-raw-snapshot 190 can be obtained. At 164, the governmental authorized server 180 can recreate or reconstruct the PRS scenario based on the pretended time and position (indicated time and location). Note that only PRS enabled authorities with a valid key (first key of the satellite navigation system 110) covering the timeframe can do this. The governmental authorized server 180 can verify the pretended time and location of the PRS-snapshot 190 with a cross-correlation (correlation of the first component in the digital form and the reconstructed first component in the digital form), to obtain an approved time and position 210 or a denied time and position 212. If the time and position is approved, then governmental authorized server 180 can indicate to the server 200 the approved time and position 210 by means of an information 214 describing that the position and time of measurement is verified. If the time and position is denied, then governmental authorized server 180 can indicate to the server 200 of the customer that the time and position is denied 212 by means of an information 216 describing that a spoofing of position and/or time is detected. Moreover, the governmental authorized PRS agency can cryptographically sign the snapshot and the validated time and location.

Figure 9:
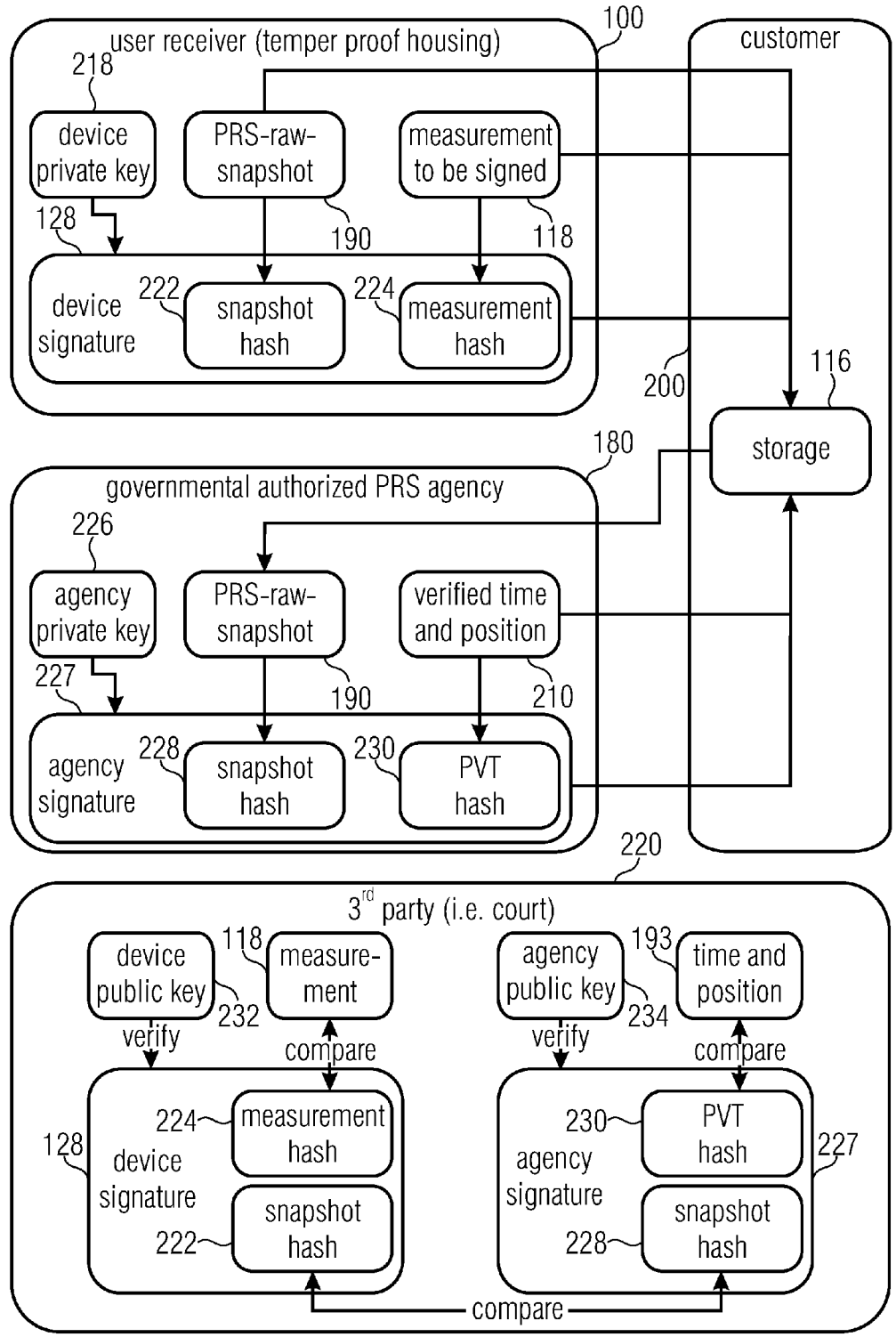
FIG. 9 shows an illustrative view of the satellite navigation receiver, the governmental authorized server and a 3rd party server, according to an embodiment.

FIG. 9 shows an illustrative view of the satellite navigation receiver 100, the governmental authorized server 180 and a 3rd party server 220 according to an embodiment of the present invention.

The satellite navigation receiver 100 can comprise an encryption unit 126 configured to encrypt the PRS-raw-snapshot 190 (first component in the digital form) or the measurement 118 to be signed using a private key 218 in order to obtain a device signature 128 (encrypted data), and to store the device signature 128 on the storage 116. The device signature 128 can include a snapshot hash 222 and a measurement hash 224. In other words, the mobile device 100 has its own private key 218 to sign the PRS-raw-snapshot 190 and its measurements 118.

The customer can forward the PRS-raw-snapshot 190 to the governmental authorized PRS agency. The governmental authorized server 180 can be configured to encrypt the PRS-raw-snapshot 190 (first component in the digital form) and the verified time and position 210 using an agency private key 226, in order to obtain an agency signature 227, and to store the agency signature 227 on the storage 116. The agency signature 227 can include a snapshot hash 228 and a PVT hash 230. In other words, the governmental authorized PRS agency has its own private key 226 to sign the calculated time and position 210.

The 3rd party server 220, e.g., a court, can be configured to verify the indicated time and position 193 by verifying the device signature 128 using a device public key 232 (public key of the satellite navigation receiver) and the agency signature 227 using an agency public key 234, and by comparing the measurement 118 with the measurement hash 224 of the device signature 128, the time and position 193 with the PVT hash 230 of the agency signature 227, and the snapshot hash 222 of the device signature 128 with the snapshot hash 228 of the agency signature 227. In other words, a third party can verify the location and time of a measurement by verification of the hash signatures and comparison of the hashes with the provided data.

Figure 10:
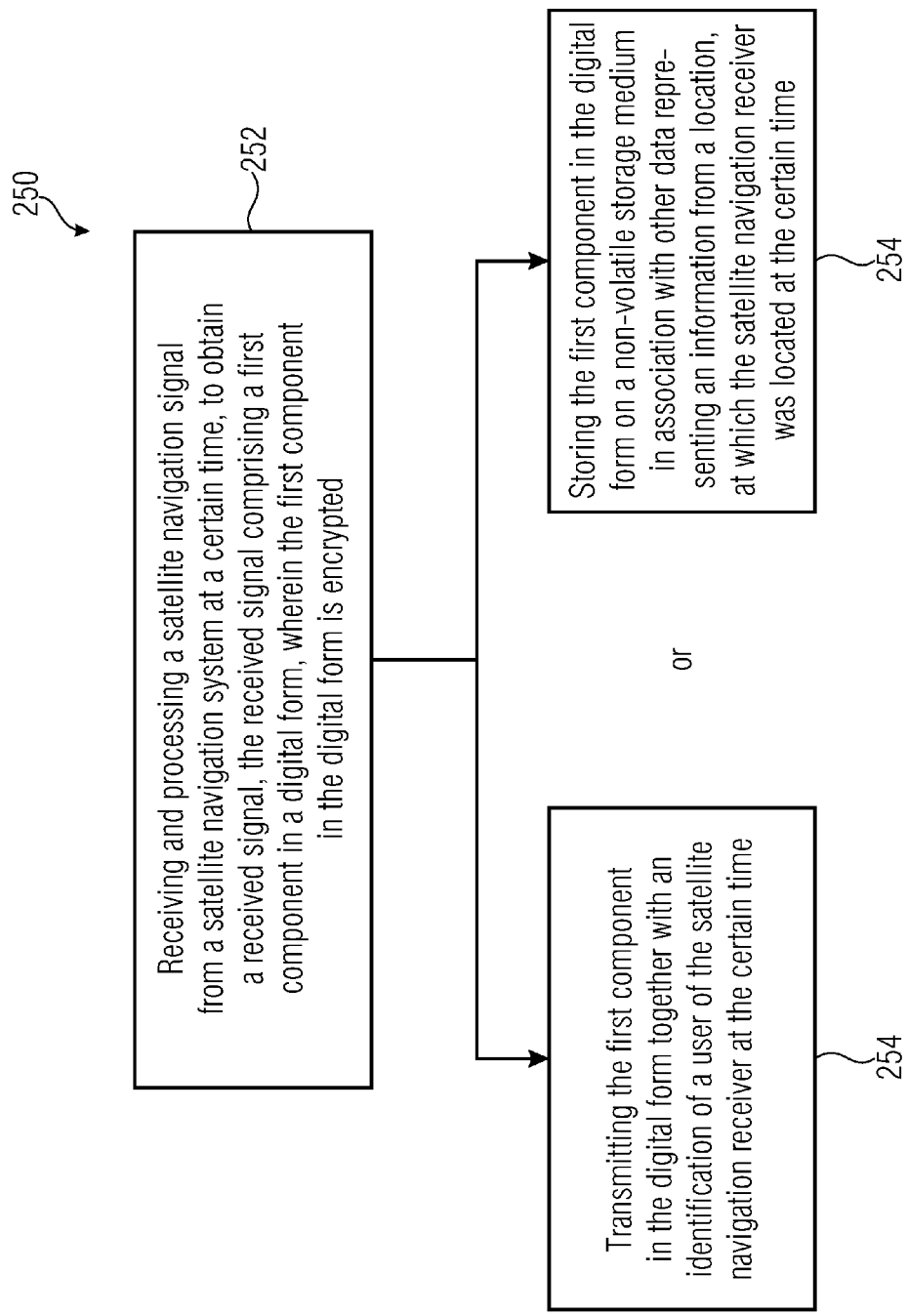
FIG. 10 shows a flowchart of a method according to an embodiment.

FIG. 10 shows a flowchart of a method 250 according to an embodiment. A first step 252 of the method 250 comprises receiving and processing a satellite navigation signal from a satellite navigation system at a certain time, to obtain a received signal, the received signal comprising a first component in a digital form, wherein the first component in the digital form is encrypted. A second step 254 of the method 250 comprises transmitting the first component in the digital form together with an identification of a user of the satellite navigation receiver at the certain time, or storing the first component in the digital form on a non-volatile storage medium in association with other data representing an information from a location, at which the satellite navigation receiver was located at the certain time.

As already indicated, in some embodiments, the satellite navigation signal 108 received by the receiver unit 104 of the satellite navigation receiver 100 or in the step 252 of the method 250 can be a Galileo signal 108 from the Galileo satellite navigation system 110. The first component in the digital form can be the PRS component of the Galileo signal 108. Moreover, in some embodiments, the second component in the digital form can be the OS (or CS) component of the Galileo signal 108.

Figure 11:
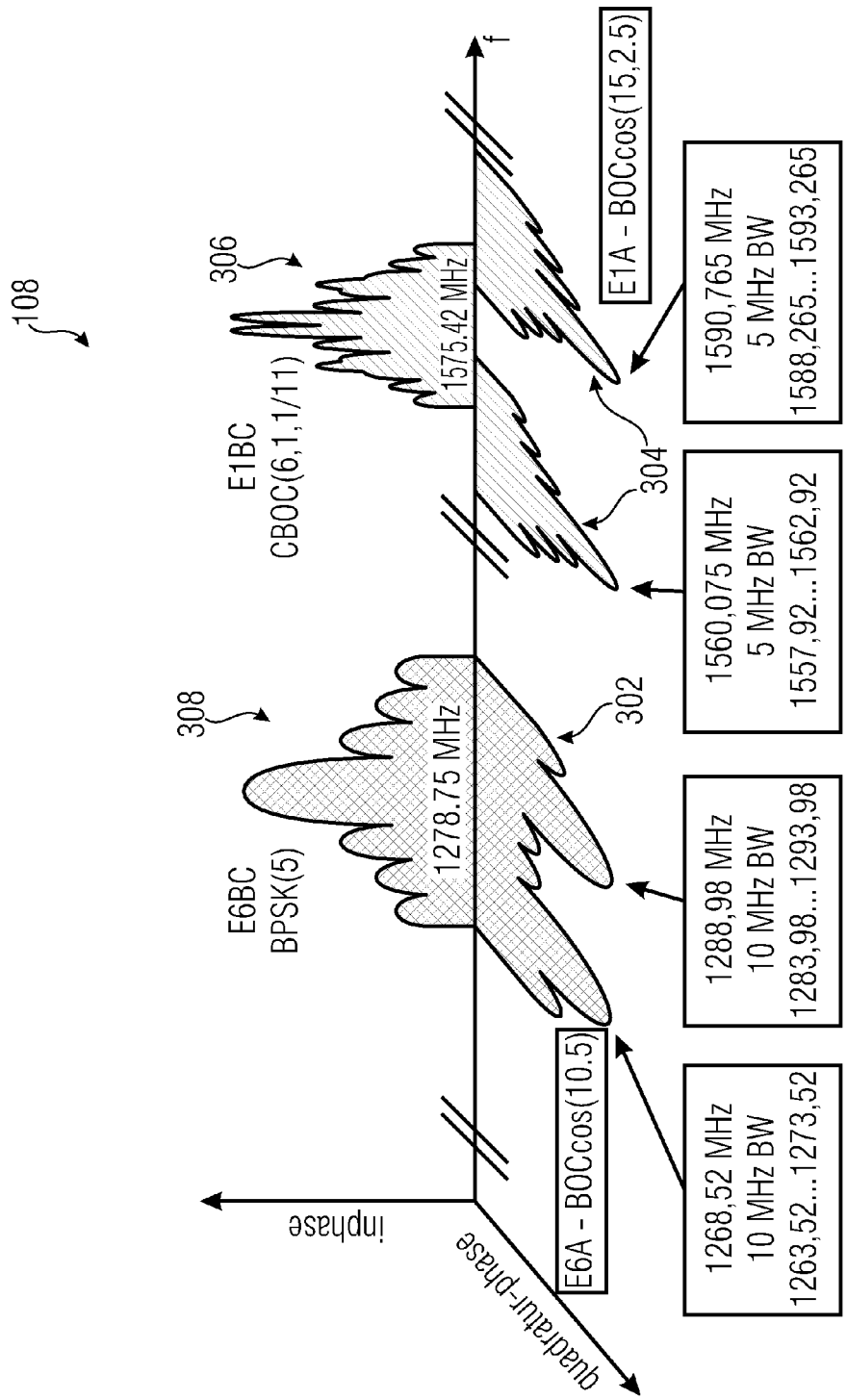
FIG. 11 shows a diagram of the Galileo signal received from the Galileo satellite navigation system plotted over the frequency.

FIG. 11 shows a diagram of the Galileo signal 108 received from the Galileo satellite navigation system 110 plotted over the frequency. The PRS components 302 and 304 are the quadrature-phase components of the Galileo signal 108, where the OS component 306 and the CS component 308 are the in-phase components of the Galileo signal 108.

In the following, the concept of embodiments is summarized by way of example and for illustration purposes using the PRS component of the Galileo signal 108 as the first component in the digital form.

The Galileo PRS

Galileo Public Regulated Service (PRS) is a special navigation service intended for governmental and governmental authorized users, e.g. police, border control, emergency, armed forces and Search and Rescue (SAR), as well as operators of critical infrastructures like telecommunication- and energy-networks and critical transports. The first PRS signals are already there since launch of the first Galileo IOV satellites in autumn 2011. Galileo PRS will be one of the first ready-to-use Galileo Services.

The PRS features encrypted signals on two frequency bands with restricted access for specific authorized users as mentioned above. The access to the PRS is controlled by the Member states through an encryption key system. The standard user will not be able to access any information of Galileo PRS. Moreover the Galileo PRS availability will be continuously monitored and will provide an inherently higher jamming robustness thanks to its sophisticated modulation scheme.

As depicted in FIG. 11, the Galileo PRS signals are transmitted in a coherent way together with the Open Service (OS) signals and Commercial Service (CS) signals over the E1A and E6A frequency bands, using BOCc(15, 2.5) and BOCc(10,5) modulation (BOC=binary offset carrier), respectively. BOCc uses a cosine phased subcarrier resulting in higher frequency components than a sine phased subcarrier used in BOCs modulations of e.g. Galileo E1BC OS. As a result, more energy is shifted to the edges of the band what improves the spectral separation with the coexisting OS and CS signals and the theoretical tracking performance.

FIG. 11 shows Galileo PRS (302 and 304), CS and OS signals (306 and 308) in the E1 and E6 band.

Thanks to the strong encryption used, spoofing the Galileo signal is not possible. This enables the guarantee of an authenticated position, velocity and timing service.

Due to the high security requirements needed in a Galileo PRS receiver, PRS receivers will not become mass-market devices. They only will be available for a certain well selected group of governmental authorized users and have to be constantly supervised and maintained with key refills.

This idea of using Galileo PRS for Location-based Services (LBS) presents a method how also ordinary people can profit from Galileo PRS without having to care about the strong security requirements of PRS or even jeopardizing the PRS security ring of trust. No PRS security related functions are needed on the user side. The idea necessitates only the server side—being a governmental authorized user—to deal with the real PRS signal structure and its security requirements. The additional use of PRS in the mass market leads to more acceptance of Galileo and its added value compared to GPS, since the PRS is a service GPS cannot provide.

Description of the Idea

It is well known that Galileo PRS adds a legal value on a PRS PVT solution. This means it is guaranteed by the strong encryption used, that the PVT cannot be spoofed. This property is a key opener to a lot of critical and demanding application mostly in the security related areas. The disadvantage of the standard PRS service is that only certain user groups can profit from PRS and that handling of the security related receiver is very demanding.

The general idea behind PRS is that only someone having the encryption key is capable of receiving and processing the PRS signals and their messages. Without knowledge of the keys, the pseudo-random-noise (PRN) sequences used are like a one-time-pad—"a type of encryption which has been proven to be impossible to crack if used correctly" [http://en.wikipedia.org/wiki/One_time_pad].

By collecting a certain amount of raw data of the PRS frequencies with an adequate bandwidth, the actual position and time where the snapshot was taken can be traced back. In contrast to snapshot positioning with OS signals, position estimation is not mandatory, since the PRS 'one-time-pad'- like sequences have no ambiguities. Moreover, by combining this raw data with e.g. a document, a unique position and time stamp is added which can provide a legal value. Only institutions authorized to use Galileo PRS and having keys covering the pretended timeframe of the document's date are capable to check the position and time of the signature.

Three different "use cases" with possible practical applications will be described, to demonstrate the manifoldness the idea: privacy protected localization, authenticated environmental monitoring, and verification of location and time of a measurement.

A position and time authentication based on the military GPS signals was proposed in [S. Lo et al, "Signal Authentication: A Secure Civil GNSS for Today", Inside GNSS September/October 2009]. In contrast to the idea presented here, they need to record constantly the raw data including the military GPS signals nearby the position of interest, to be able to prove the position and time later on by a cross correlation between the snapshot signal and its reference received counterpart.

By using a PRS snapshot, no reference data collection network or a trusted reference station is needed, since the PRS constellation for a cross-correlation check can be regenerated afterwards according to the pretend position and time. Moreover the fact that only special authorized agencies are capable of doing this cross correlation with our proposed method, the privacy of the user is guaranteed.

Since all PRS security related tasks are concentrated on the governmental authorized PRS user side, the method is without any risk for the PRS network of security. But the ordinary user can still profit from PRS as shown in the "use cases" section later on.

Technical Description and Implementation of the Idea

A snapshot of raw-data, wideband enough to include not only the Galileo OS but also the Galileo PRS, with a certain length (in the range of a few tens of milliseconds) is recorded. The method can be applied to both E1 and E6 frequency bands. But since the CS service on E6 is not defined yet, only the E1 band including the Galileo OS signals E1BC (306 and 308) and Galileo PRS E1A (302 and 304), see FIG. 11, is used in the following.

Using a raw-PRS snapshot receiver 100 comprising of an integrated or external antenna, an RF-down converter chip 182, an analog to digital converter (ADC) 184, and a data transmission controller (e.g. USB, Bluetooth or WiFi) 186, raw Galileo PRS/OS snapshot data are recorded on hard disk. In the software running on the client's computer a Galileo E1 OS acquisition is done to check that the snapshot of raw data was successful. If the OS signals can be acquired, also the PRS signals are present since OS and PRS signals are transmitted together. After a successful signal check the Galileo OS components (including also the other open service signals like the GPS L1 C/A) are removed by a high-pass filter 124, leaving just the PRS-noise (see FIG. 11). The reason is twofold: Firstly by removing the OS components, only governmental authorized PRS agencies can use the raw data for a position and time check, guaranteeing the users' privacy. Secondly the removal of the OS components by a high-pass filter 124 reduces the file size of the snapshot significantly. This raw-PRS snapshot can already be used for some privacy protected localization applications described in the "use case 1" later on. Its architecture is depicted in FIG. 5.

For other authentication applications like the one described in "use case 2" and "use case 3", the raw-PRS snapshot is further used as a digital fingerprint on the measurement, file or document to be authenticated. This architecture is depicted in FIG. 5. The reported position and time of the measurement, file or document itself and the raw-PRS snapshot are combined in a cryptographic way, e.g. using hash functions and a public key infrastructure. The combined data package is transmitted instantaneously to a customer's storage 116 server 200.

For validation and authentication purpose the customer can now transmit this data package to a governmental authorized PRS agency server 180. Using the reported position and time 193, the governmental authorized PRS agency can recreate the given PRS scenario and do a cross correlation to check, if the pretended time and position match. Since a valid PRS key is necessitated to do this check, only governmental authorized PRS agencies are capable of doing it. Then the integrity of the file signed with the raw-data snapshot can be decided. If a false position and/or time were provided, the correlation with the recreated scenario will not be successful. By extending the search space and with some more computational effort is possible for the authorized PRS agency even to find out the actual position and time of the snapshot.

Use Cases

Use Case 1) Privacy Protected Localization

A PRS-raw-data snapshot is recorded using the techniques described above: the OS signals are used to check if the PRS-information is likely to be included, the OS signals are removed from the snapshot and the raw data stamp is uploaded to a server. The uploaded data does not need to be specially protected since no one but PRS authorized agencies are capable to get the position out of the snapshot using their PRS server facility. As long as the user trusts the PRS enabled authorities, the user's privacy is very well protected. This enables the handling of the otherwise very sensitive personal localization data in a much more trustworthy way.

FIG. 5 shows a privacy protected localization architecture.

One practical application for the privacy protected localization is e.g. the localization or tracking of elderly people, e.g., suffering from dementia. The balance between the patient's privacy and the level of protection is floating. The described method of privacy protected localization helps these persons to age with dignity and respect even though their position is constantly made available with PRS snapshots. Since only authorized personal can access in emergency situation their position information, the privacy is very well protected in contrast to the simple GPS tracker already available on the market, exposing the position to everyone, opening doors to abuse the patient's rights.

The same method can also be applied for prisoners' electronic tags used in minimal security or open prison. The prisoner profits from the better protection of his privacy and the guards from the higher spoofing and anti jamming capability of Galileo PRS.

Another practical application where privacy protected localization could be used is the emergency call (ecall) system installed in more and more cars. To protect the position information of the driver, e.g. from abuse by insurance or marketing companies, PRS snapshots as described above will remain the users' privacy without risking the lifesaving localization information in emergency situations. Another problem faced by the conventional ecall GPS localization systems is that the time to first fix of current GPS receivers is often too slow to provide an instant position, especially in obstructed areas. The ecall could be canceled before a position was transmitted. With transmitting only a snapshot of the received data, the emergency agency can use its high processing power and invest more time to gain a position from this raw data snapshot. Moreover the robust signal design of Galileo PRS enhances the position accuracy and reconstruction robustness.

Use Case 2) Authenticated Environmental Monitoring

In Germany larger cities have to do regular monitoring of environmental parameters like particulate matter, carbon dioxide emissions, and so forth. Therefore some stationary equipment was installed. Due to the high cost of this equipment and its maintenance, only a few sites per city are monitored. Until now no mobile equipment is used, as the position and time of the measurement would have to be securely verified.

With the concept of the authentication applications described in the section above and the architecture depicted in FIG. 8 it is possible to do this verification, even when the measurement equipment has no standalone PRS receiver. By uploading the recorded environmental data cryptographically combined together with a PRS-snapshot on a server, the customer is able to verify the position and time of the measurements afterwards with the help of a governmental authorized PRS agency.

Since there is typically more than one environmental measurement stations involved, it is assumed that there is a basic correlation between the recorded environmental data and also between the PRS snapshot locations. This additional correlation can be used as a ring-of-trust making any spoofing attempt (e.g. replay-attacks of wrong PRS-snapshots or environmental data) very unlikely and extremely challenging. Moreover the complete measurement setup could also be tamper proof, so that neither the environmental measurements nor the snapshots can be faked.

Furthermore the presented application could also be used for a disposal of waste monitoring. When the waste is disposed a system connected to the tailboard of the disposal truck could automatically initiate the collection of a raw-PRS snapshot and transmit this to the responsible agency. Now this agency can check that a container of waste was disposed at a predefined location according to the rules.

Use Case 3) Verification of Location and Time of a Measurement

Measurements like photos, audio files, videos, but also documents often have the need to be verified and/or authenticated where and when they were made. Typical examples are evidence used in a trial, e.g. photos taken by the police of a crime scene. This verification process can be realized with our presented idea by using the raw-PRS snapshot to sign such a measurement for adding certain legal information to the object. Afterwards a governmental authorized PRS agency can be instructed to verify the location and time of the measurement. The procedure is basically the same as for the authentication applications described in use case 2 and depicted in FIG. 8.

Already in 1996 an approach for an "authenticated camera" was presented [Kelsey, J.; Schneier, B.; Hall, C.; "An authenticated camera," Computer Security Applications Conference, 1996., 12th Annual, vol., no., pp. 24-30, 9-13 Dec. 1996; doi: 10.1109/CSAC.1996.569666] using a certain interaction between the camera and its base station before and after its usage. The biggest gap identified in their proposed architecture is the strong need for authenticated location data which was not provided or even foreseen by any GNSS back then in 1996. The instant authentication of measurement idea can exactly provide this necessitated authenticated location data and time, thanks to the Galileo PRS service used in the proposed raw-PRS snapshot way.

Another very interesting field of application for the verification of location and time of a measurement use case could be the adoption of the described technique for a toll collect system. For that a tamper proof on-board unit containing the user receiver is recommended. Also a combination of the PRS-raw samples with the OS samples could be useful in that case.

And finally the verification of location and time of a measurement could be used as a skimming prevention system for bank transfers and credit card payments. The generation of the TAN or the usage of a credit card payment over the internet can be coupled to the location information provided by a transmitted and then verified PRS-raw data snapshot.

FIG. 8 shows a authentication architecture.

Conclusion

Thus, ideas of how ordinary people can profit from LBS authentication using the Galileo PRS service without having to care about any security related PRS-receiver challenges while protecting the user's privacy have been discussed. Using the open service signals, recorded raw-data snapshots are verified if OS and PRS signals were successfully recorded. Then the OS components are removed from the file to protect the privacy of the user and to shrink the snapshot size. Now only authorities equipped with PRS keys and equipment are able to reconstruct time and position out of the modified snapshot signal. Moreover the snapshot can also be used to sign a measurement, file or object just before it is transmitted to a server. This method can even add a legal value to the snapshot. Thanks to the spoofing and jamming resistant PRS signals, the use of these special PRS-snapshots leads to a much higher service availability. A demonstrator platform for realizing a proof of concept was described. Finally three different use cases (privacy protected localization, authenticated environmental monitoring, and verification of location and time of a measurement) with practical applications of the presented idea were discussed to demonstrate both the manifoldness and the advantages of our idea compared to other existing or conventional solutions.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments comprise a data carrier having electronically readable control signals, which are capable of cooperating with a programmable computer system, such that one of the methods described herein is performed.

Generally, embodiments can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A satellite navigation receiver, comprising:
a receiver unit configured to receive and process a satellite navigation signal from a satellite navigation system at a certain time, to obtain a received signal, the received signal comprising a first component in a digital form, wherein the first component in the digital form is encrypted; and
a transmitter configured to transmit the first component in the digital form together with an identification of a user of the satellite navigation receiver at the certain time.

2. The satellite navigation receiver according to claim 1, wherein the received signal comprises a second component in the digital form, wherein the satellite navigation receiver comprises a verification unit configured to verify whether data carried by the second component in the digital form is valid; and
wherein the transmitter is configured to transmit the first component in the digital form together with the identification of the user, if the data carried by the second component in the digital form is valid.

3. The satellite navigation receiver according to claim 2, wherein the verification unit is configured to verify whether the data carried by the second component in the digital form is valid by verifying whether a position of the satellite navigation receiver can be determined based on the data carried by the second component in the digital form.

4. The satellite navigation receiver according to claim 2, wherein the satellite navigation receiver comprises a filter unit configured to filter out the second component in the digital form from the received signal, to obtain a filtered signal, the filtered signal comprising the first component in the digital form, and to provide the filtered signal to the transmitter.

5. The satellite navigation receiver according to claim 1, further comprising a controller configured to store the first component in the digital form on a non-volatile storage medium in association with other data representing an information from a location, at which the satellite navigation receiver was located at the certain time.

6. The satellite navigation receiver according to claim 1, wherein the transmitter is configured to transmit the first component in the digital form further together with an indicated time, at which the satellite navigation receiver received the satellite navigation signal.

7. The satellite navigation receiver according to claim 1, wherein the satellite navigation signal is a Galileo signal from the Galileo satellite navigation system, and wherein the first component in the digital form is a PRS component of the Galileo signal.

8. A mobile localization device, comprising:
a satellite navigation receiver according to claim 1; and
a control unit configured to control the transmitter of the satellite navigation receiver to transmit the first component in the digital form together with the identification of the user periodically or in response to an external event.

9. A mobile measurement device, comprising:
a satellite navigation receiver according to claim 1; and
a sensor configured to provide measurement data as other data describing the information from the location, at which the satellite navigation receiver was located at the certain time.

10. The mobile measurement device according to claim 9, wherein the sensor is an environmental sensor configured to provide environmental data as the measurement data.

11. A method, comprising:
receiving and processing a satellite navigation signal from a satellite navigation system at a certain time, to obtain a received signal, the received signal comprising a first component in a digital form, wherein the first component in the digital form is encrypted; and
transmitting the first component in the digital form together with an identification of a user of the satellite navigation receiver at the certain time.

12. A method for localizing a user of a satellite navigation receiver, wherein the satellite navigation receiver comprises a receiver unit and a transmitter, wherein the receiver unit is configured to receive and process a satellite navigation signal from a satellite navigation system at a certain time and location, to obtain a received signal, the received signal comprising a first component in a digital form, wherein the first component in the digital form is encrypted, and wherein the transmitter is configured to transmit the first component in the digital form together with an identification of the user of the satellite navigation receiver at the certain time, wherein the method comprises:
- receiving the first component in the digital form together with the identification of the user of the satellite navigation receiver at the certain time;
- reconstructing the first component of the satellite navigation system based on an indicated time using an encryption key of the satellite navigation system;
- correlating the first component in the digital form and the reconstructed first component in the digital form, in order to obtain the certain time and location, at which the satellite navigation receiver received the satellite navigation signal; and
- allocating the certain time and location to the user identified by the identification.

13. A method for verifying whether other data representing an information from a location was recorded at an indicated time and location, wherein the other data representing the information from the location is stored on a non-volatile storage medium in association with a first component in a digital form of a received signal that was obtained by receiving and processing a satellite navigation signal from a satellite navigation system at a certain time, wherein the first component in the digital form is encrypted, and wherein the method comprises:
- reading from the non-volatile storage medium the first component in the digital form;
- reconstructing the first component in the digital form of the satellite navigation signal based on the indicated time and location using a first encryption key of the satellite navigation system; and
- correlating the first component in the digital form and the reconstructed first component in the digital form, in order to verify whether the other data was recorded at the indicated time and location.

14. A computer program comprising a program code for performing, when running on a computer or microprocessor, a method according to claim 12.

15. A computer program comprising a program code for performing, when running on a computer or microprocessor, a method according to claim 13.

16. A satellite navigation receiver, comprising:
- a receiver unit configured to receive and process a satellite navigation signal from a satellite navigation system at a certain time, to obtain a received signal, the received signal comprising a first component in a digital form, wherein the first component in the digital form is encrypted; and
- a controller configured to store the first component in the digital form on a non-volatile storage medium in association with other data representing an information from a location, at which the satellite navigation receiver was located at the certain time.

17. The satellite navigation receiver according to claim 16, wherein the received signal comprises a second component in the digital form, wherein the satellite navigation receiver comprises a verification unit configured to verify whether data carried by the second component in the digital form is valid; and
- wherein the controller is configured to store the first component in the digital form on the non-volatile storage medium in association with the other data, if the data carried by the second component in the digital form is valid.

18. The satellite navigation receiver according to claim 17, wherein the verification unit is configured to verify whether the data carried by the second component in the digital form is valid by verifying whether a position of the satellite navigation receiver can be determined based on the data carried by the second component in the digital form.

19. The satellite navigation receiver according to claim 17, wherein the satellite navigation receiver comprises a filter unit configured to filter out the second component in the digital form from the received signal, to obtain a filtered signal, the filtered signal comprising the first component in the digital form, and to provide the filtered signal to the controller.

20. The satellite navigation receiver according to claim 16, wherein the controller is configured to store the first component in the digital form on the non-volatile storage medium further in association with an indicated time or location, at which the other data were recorded.

21. The satellite navigation receiver according to claim 16, wherein the satellite navigation receiver comprises an encryption unit configured to encrypt the first component in the digital form or the other data representing the information from the location, at which the satellite navigation receiver was located at the certain time, using a private key in order to obtain encrypted data, wherein the controller is configured to store the first component in the digital form on the non-volatile storage medium further in association with the encrypted data.

22. The satellite navigation receiver according to claim 16, wherein the satellite navigation signal is a Galileo signal from the Galileo satellite navigation system, and wherein the first component in the digital form is a PRS component of the Galileo signal.

23. A mobile measurement device, comprising:
- a satellite navigation receiver according to claim 16; and
- a sensor configured to provide measurement data as the other data describing the information from the location, at which the satellite navigation receiver was located at the certain time.

24. The mobile measurement device according to claim 23, wherein the sensor is an environmental sensor configured to provide environmental data as the measurement data.

25. A method, comprising:
- receiving and processing a satellite navigation signal from a satellite navigation system at a certain time, to obtain a received signal, the received signal comprising a first component in a digital form, wherein the first component in the digital form is encrypted; and
- storing the first component in the digital form on a non-volatile storage medium in association with other data representing an information from a location, at which the satellite navigation receiver was located at the certain time.

* * * * *